/21/87 OR RE 32,403 BEST AVAILABLE COPY

United States Patent [19]

Bobier

[11] E Patent Number: Re. 32,403

[45] Reissued Date of Patent: Apr. 21, 1987

[54] FLUID DEVICE HAVING INTERCHANGEABLE DISPLACEMENT CONTROL MEANS

[75] Inventor: Wilfred S. Bobier, Bloomfield Hills, Mich.

[73] Assignee: Dana Corporation, Toledo, Ohio

[21] Appl. No.: 412,025

[22] Filed: Aug. 26, 1982

Related U.S. Patent Documents

Reissue of:

[64] Patent No.: 3806280

U.S. Applications:

[63] Continuation of Ser. No. 211,224, Nov. 28, 1980, abandoned, which is a continuation-in-part of Ser. No. 60,333, Aug. 3, 1970, Pat. No. 3,739,691.

[51] Int. Cl.[4] ..... F01B 13/04; F04B 1/26

[52] U.S. Cl. ..... 92/12.2; 417/222; 91/506

[58] Field of Search ..... 91/504 E, 506; 92/12.2; 417/218, 222; 60/446

[56] References Cited

U.S. PATENT DOCUMENTS

| | | | |
|---|---|---|---|
| 1,659,374 | 2/1928 | Robson | 91/505 |
| 1,722,832 | 7/1929 | West | 91/505 |
| 2,146,117 | 2/1939 | Gros | 91/506 |
| 2,210,129 | 8/1940 | Rose | 417/222 |
| 2,452,754 | 11/1948 | Herrstrom | 91/506 |
| 2,748,613 | 6/1956 | Guay | 91/506 |
| 3,060,690 | 10/1962 | Horlacher | 91/506 |
| 3,117,457 | 1/1964 | Burt | 74/107 |
| 3,124,008 | 3/1964 | Firth et al. | 91/506 |
| 3,139,038 | 6/1964 | Stewart | 74/60 |
| 3,175,509 | 3/1965 | Kuze | 91/506 |
| 3,188,810 | 6/1965 | Kuze | 91/506 |
| 3,250,227 | 5/1966 | Kouns | 91/506 |
| 3,302,585 | 2/1967 | Adams et al. | 417/222 |
| 3,384,028 | 5/1968 | Thoma | 91/506 |
| 3,405,696 | 10/1968 | Thoma | 91/499 |
| 3,429,225 | 2/1969 | Keyworth | 92/122 |
| 3,512,178 | 5/1970 | Russell | 417/222 |
| 3,588,286 | 6/1971 | Skinner | 91/506 |
| 3,633,464 | 1/1972 | Aoyama | 60/445 |

FOREIGN PATENT DOCUMENTS

| | | | |
|---|---|---|---|
| 1066423 | 2/1958 | Fed. Rep. of Germany | 92/12.2 |
| 1269494 | 5/1968 | Fed. Rep. of Germany | 91/504 |
| 1453544 | 7/1969 | Fed. Rep. of Germany | 91/504 |
| 1314483 | 12/1962 | France | 92/12.2 |
| 204122 | 6/1922 | United Kingdom | 92/12.2 |
| 831317 | 3/1960 | United Kingdom | 60/446 |
| 1048637 | 11/1966 | United Kingdom | 91/506 |
| 1079857 | 8/1967 | United Kingdom | 91/506 |

OTHER PUBLICATIONS

Lucas-Rotax Pump Model IP-1000 (1961) as described in Depositions of Ellis Born and Willard Baker (Exhibits 71-74) in Civil Action No. 972547 (E.D. Mich.).

Defendant's Deposition Exhibit 52-C (Abex-Denison Marketing Bulletin P-4-C for Series 700 pump).

*Primary Examiner*—Carlton R. Croyle

*Assistant Examiner*—Paul F. Neils

*Attorney, Agent, or Firm*—Basile, Weintraub & Hanlon

[57] ABSTRACT

A fluid device of the axial piston type having high and low pressure operating passages, one of which may be an inlet and the other an outlet depending upon the pumping or motoring function of the device and the direction of rotation. The fluid device, which is of the variable displacement type, has a rotatable cylinder barrel with one end of each of a plurality of pistons disposed for reciprocation within cylinder bores at one end of the cylinder barrel, and cylinder ports successively communicating each of the cylinder bores with arcuate inlet and outlet passages formed in a valving face disposed at the opposite end of the cylinder barrel. The other ends of the pistons engage a pivotably mounted thrust plate adapted to impart a reciprocal movement to the pistons within the cylinder bores as the cylinder barrel is rotated. In one example of the invention, the thrust plate is provided with a coupling mechanism adapted to be operated by any one of a plurality of interchangeable displacement control mechanisms which vary the inclination of the thrust plate with respect to the axis of rotation of the cylinder barrel and thus the amount of reciprocal movement of the pistons within the cylinder barrel. The device is adapted to be converted into a manifold system adapted to accommodate a plurality of valves with a minimum of external fluid conduits.

1 Claim, 9 Drawing Figures

FLUID DEVICE HAVING INTERCHANGEABLE DISPLACEMENT CONTROL MEANS

Matter enclosed in heavy brackets [ ] appears in the original patent but forms no part of this reissue specification; matter printed in italics indicates the additions made by reissue.

CROSS REFERENCE TO RELATED PATENT APPLICATION

The present invention is a continuation-in-part application of co-pending U.S. patent application Ser. No. 60,333, filed Aug. 3, 1970, for a "Fluid Device", now U.S. Pat. No. 3,739,691 in the name of Wilfred S. Bobier. *This application for reissue is a continuation of a copending application for reissue Ser. No. 211,224 filed Nov. 28, 1980 now abandoned.*

BACKGROUND OF THE INVENTION

1. Field of the Invention

The present invention relates to fluid devices and particularly to those of the variable displacement axial piston type which may function either as a fluid pump or as a fluid motor.

2. Description of the Prior Art

Heretofore, fluid pumping or motoring devices of the axial piston type have been constructed of a metallic housing having a revolving cylinder barrel with a plurality of parallel cylinder bores therein, within which pistons are reciprocated by means of a thrust plate assembly or the like. A rotary valve mechanism in the form of cylinder ports at one end of the cylinder barrel alternately connects each cylinder bore with an inlet and an outlet passage of the device as the cylinder barrel is rotated.

The thrust plate assembly in fluid devices of the variable displacement type normally takes the form of a yoke having transversely extending pintles rotatably carried in bearings suitably mounted to the wall of the housing. Suitable means are provided to pivot the thrust plate with respect to the longitudinal axis of the drive shaft on which the cylinder barrel is rotated so as to vary the amount of reciprocal stroking movement imparted to the pistons within the cylinder bores and thereby permit a selected variation in the fluid displaced by the axial piston fluid devices.

In such previously constructed axial piston fluid devices, the displacement control mechanism used to control the inclination of the thrust plate assembly with respect to the longitudinal axis of the drive shaft has necessitated a different design for the fixed displacement device and the variable displacement pump as the displacement control mechanism is normally constructed as an integral part of the housing in variable displacement devices, and thus a variable displacement device requires a larger housing than a fixed displacement device. Heretofore, the same housing could not be used for both variable and fixed displacement devices, as a larger housing is required for the variable displacement device since a portion of the housing is needed to mount the displacement control mechanism. The use of a variable displacement housing in a fixed displacement device results in an unduly large unit in proportion to its displacement. It would therefore be desirable to provide a housing having a construction adapted to accommodate both variable displacement and fixed displacement devices without requiring a larger housing for the variable displacement design.

It has also been a conventional practice to construct such previously used devices with only one type of displacement control mechanism, that is, a different application requiring a different type of displacement control mechanism, such as a manual control or a pressure compensated control, would require a major disassembly of the device to convert from one type displacement control mechanism to another or would require a different housing construction for each type of displacement control mechanism. It would therefore be desirable to provide a construction which permits an easy interchangeable use of different types of displacement control mechanisms.

SUMMARY OF THE INVENTION

The present invention, which will be described subsequently in greater detail, comprises a fluid pumping or motoring device of the axial piston type having a pivotably mounted thrust plate and means adapted to operatively couple the thrust plate to any one of several types of displacement control mechanisms.

It is therefore an object of the present invention to provide a rotary fluid device of the axial piston type having an improved construction which is readily adapted to low cost manufacturing.

It is also an object of the present invention to provide a rotary fluid device of the axial piston type having an improved thrust plate construction.

It is also an object of the present invention to provide a rotary fluid device of the axial piston type having means for varying the displacement thereof, and a housing construction adaptable to accommodate different types of displacement control mechanisms.

It is a further object of the present invention to provide a fluid device adapted to be converted into a manifold system.

Other objects, advantages, and applications of the present invention will become apparent to those skilled in the art of such fluid devices when the accompanying description of several examples of the present invention is read in conjunction with the accompanying drawings.

BRIEF DESCRIPTION OF THE DRAWINGS

The description herein makes reference to the accompanying drawings wherein like reference numerals refer to like parts throughout the several views, and in which.

DESCRIPTION OF THE PREFERRED EMBODIMENTS

Figure 1:
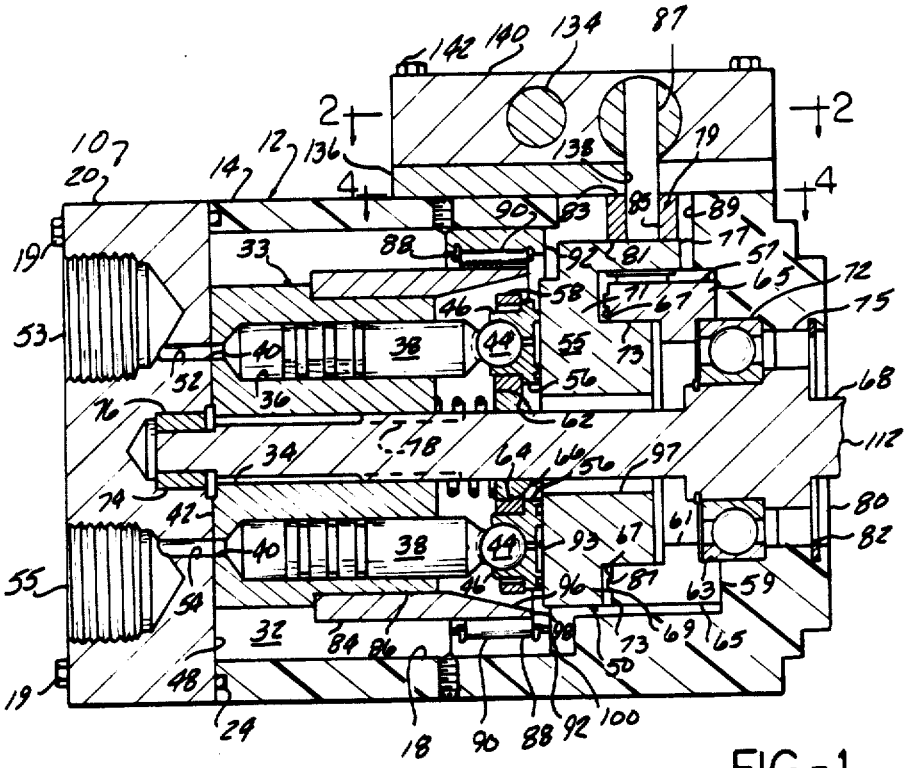
FIG. 1 is a longitudinal, cross-sectional view of a variable displacement fluid device and one type of displacement control mechanism.

Referring to the drawings and particularly to FIG. 1, there is illustrated a fluid device in the form of an axial piston pump 10 comprising a housing 12 having a body section 14 with a longitudinally disposed bore 18 enclosed by a cap 20 secured to the body section by any suitable fastening means, such as screws 19, extending axially through the cap 20 and into the threaded bores in the body section 14. An O-ring 24 insures a fluid tight seal between the juncture of the body section 14 and the cap 20. The body section 14 includes a pilot portion (not shown) forming a mounting flange to permit the mounting of the pump 10 at a desired location.

The housing bore 18 forms a chamber 32 in which a rotating group 33 is positioned. The rotating group 33 includes a cylinder barrel 34 which is provided with a plurality of arcuately spaced and longitudinally disposed cylinder bores 36, each having one end of a piston 38 axially slidable therein. A plurality of cylinder ports 40 axially aligned with each cylinder bore 36 communicate each of the cylinder bores 36 with a front face 42 of the cylinder barrel 34. Each of the pistons 38 have spherical ends 44 on which are swagged socketed shoes 46. The cylinder barrel 34 is positioned axially between a valving face 48 formed on the inner face of the cap 20 and an inclined thrust plate assembly 50. The valving face 48 serves in a well known manner to provide a properly phased connection between the cylinder ports 40 and a pair of arcuate ports 52 and 54, such that the cylinder ports 40 communicate successively with the arcuate ports 52 and 54 as the cylinder barrel 34 rotates. The arcuate ports 52 and 54 are, respectively, connected to the external outlet and inlet connection ports 53 and 55 of the pump 10.

The piston shoes 46 have outwardly extending flanges 56 which are contacted by an annular cage 58 with holes corresponding to each piston 38. The annular cage 58 has a centrally disposed conical bore 62 adapted to contact a spherical outer surface 64 of a collar 66 which is, in turn, carried on a drive shaft 68 that extends longitudinally through the housing bore 18. A spring 70 disposed between the piston end of the cylinder barrel 34 and the collar 66 exerts a force urging the face 42 of the cylinder barrel 34 into engagement with the valving face 48, while at the same time biases the shoes 46 by means of the collar 66 and the annular cage 58 into engagement with the thrust plate assembly 50.

The drive shaft 68 is rotatably supported between bearings 72 and 74. The bearing 72 is carried in a bore 75 of a decreased diameter at the thrust plate assembly end of the housing bore 18, while the bearing 74 is carried in a centrally disposed bore 76 within the inner face of the cap 20. The drive shaft 68 is effective to transmit torque from a prime mover (not shown) to the cylinder barrel 34 through a splined driving connection 78 in a conventional manner. A conventional shaft seal 80 is provided in the decreased diameter bore 75 and retained in position by a snap ring 82.

The cylinder barrel 34 has a skirt portion 84 snugly fitted in an annular recess 86 at the piston end of the cylinder barrel 34 to form an inner race 88 for roller bearings 90, the outer race 92 of which is carried by the body section 14 in abutment with the thrust plate assembly in a manner which will be described in greater detail hereinafter. The skirted portion 84 has an annular inclined inner surface 96 extending upwardly from the cylinder barrel 34 and terminating in such a manner that the thrust plate assembly end 98 of the inner race 88 is flush with the thrust plate assembly end 100 of the roller bearings 90 to provide an increased volume for accommodating the thrust plate assembly 50, resulting in an increased displacement capacity of the pump 10 by as much as 15 percent as compared to fluid devices heretofore constructed.

Still referring to FIG. 1, as the cylinder barrel 34 rotates a reciprocating stroking motion is imparted to the pistons 38 due to the inclination of the thrust plate assembly 50, thus a relative reciprocating motion between the cylinder barrel 34 and the pistons 38 results as the cylinder barrel 34 rotates, wherein the cylinder bores 36 are alternately compressed and expanded, resulting in fluid being drawn into and expelled from the cylinder bores 36 through the cylinder ports 40.

From the foregoing it can be seen that when a rotary movement is imparted to the outer end 112 of the drive shaft 68, the cylinder barrel 34 will be rotated to alternately register the cylinder bores 36 with the arcuate ports 52 and 54 of the valving face 48 by means of the cylinder ports 40.

Figure 4:
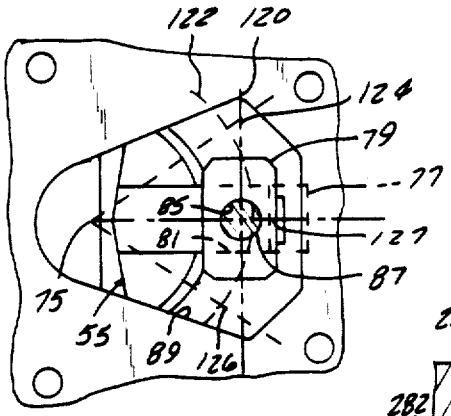
FIG. 4 is a fragmentary, transverse, cross-sectional view of the fluid device taken generally on line 4—4 of FIG. 1.
Figure 5:
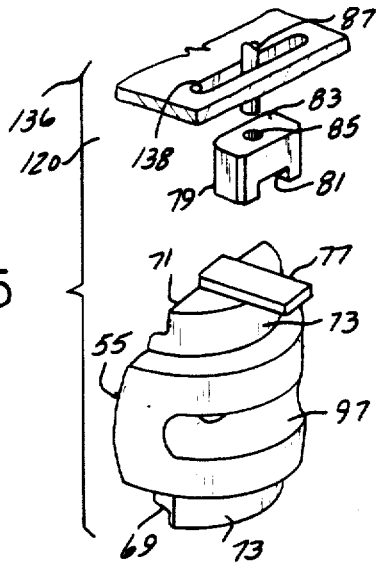
FIG. 5 is a fragmentary, exploded, perspective view of the fluid device illustrated in FIG. 1 with portions of the device removed for clarity.

Referring to FIGS. 1, 4 and 5, the thrust plate assembly 50 is shown as comprising a movable yoke 55 and a fixed yoke support 57. The fixed yoke support 57 has a U-shaped configuration, the bottom wall 59 of which has an aperture 61 through which the drive shaft 68 extends. The bore 61 has an annular recessed portion 63 of an inner diameter closely fitting the outer diameter of the drive shaft support bearing 72, and thus the yoke support 57 is axially aligned with respect to the drive shaft 68 when positioned on the outer periphery of the bearing 72.

The yoke support 57 includes a pair of axially projecting side walls 64, each of which has arcuately shaped bearing surface 67 supporting the movable yoke 55 on which the piston shoes 46 slidably engage as the cylinder barrel 34 is rotated so as to impart a reciprocal stroking movement to the pistons 38. The movable yoke 55 has a pair of transversely extending aligned support pins 69 and 71 (FIG. 5), each of which has arcuately shaped bearing surfaces 73 contoured to meet with the arcuately shaped bearing surfaces 67 of the projecting side walls 65, such that the yoke 55 is adapted to pivot within the side wall bearing surfaces 67 about an axis 75 (FIG. 1) defined by the transversely extending support pins 69 and 71 in a manner which will be described in greater detail hereinafter.

The yoke support pin 71 includes a L-shaped arm 77 integrally formed therewith and projecting rearwardly away from the support pin 71. The projecting arm 77 carries a U-shaped member 79 having a slot 81. The outer face and side walls of the arm 77 are received in the U-shaped member slots 81 in such a manner that the U-shaped member 79 is adapted to reciprocate along a portion of the length of the arm 77. The base portion 83 of the U-shaped member 79 has a bore 85 which carries a coupling pin 87 which, in turn, extends through an opening 89 (FIG. 1) formed in the side wall of the body section 14 and is adapted to be coupled to any one of several displacement varying mechanisms which will be described in greater detail hereinafter.

As can best be seen in FIG. 4, the opening 89 is so sized to enable the U-shaped member 79 to be inserted therethrough and onto the arm 77 during assembly of the pump 10. The connecting pin 87 extends through the housing body section 14 and moves along a linear path as the U-shaped member 79 and arm 77 pivot about the axis 75 defined by the supporting pins 69 and 71 without interference with the side wall of the housing body section 14. As can be seen in FIG. 1, the preferred axis of rotation of the yoke arm 77, and for purposes of description the longitudinal axis of the support pins 69 and 71, is an axis passing through the center point about which each of the arcuate bearing surfaces 67 is formed. The axis 75 should intersect the plane at which the centers of the spherical piston ends 44 lie and may also intersect the longitudinal axis of the drive shaft 68. However, the axis 75 may be vertically offset from the drive shaft axis, in a well known manner, depending upon the desired results.

The arcuately shaped bearing surfaces 67 formed on the side walls of the yoke support 57 are in the form of a plastic bearing 87 (FIG. 1), such as a teflon-lead bearing or the like, which provides the necessary support to withstand the load transmitted through the pistons 38 and the movable yoke 55, while at the same time offering the least amount of frictional resistance to the pivotal movement of the yoke 55 therewithin. The plastic bearings 87 have a central aperture adapted to receive a boss formed in each side wall 65 so as to securely retain the bearing 87 on its associated side wall 65.

The yoke 55 has a circular thrust bearing face 93 with which the shoes 46 cooperate and a hemispherical cross section with an elliptical, centrally disposed bore 97 through which the drive shaft 68 extends. The elliptical shape of the bore 97 permits the yoke 55 to rotate about the axis 75 with respect to the shaft 68 without interference therewith. The yoke 55 and the yoke support 57 are both preferably constructed of a sintered material, with the thickness of support pins 69 and 71, as measured from the bearing face 93 to the bottom of the support pin bearing surface 73, being at least 40 percent of the total thickness of the yoke 55 as measured from the bearing face 93 to the bottom thereof. This assures that the yoke 55 will withstand the loads to which it is subjected. The L-shaped arm 77 extending from the support pin 71 should have a length which is at least equal to the yoke thickness in order to provide good fill characteristics when the same is manufactured.

The amount of friction between the bearing surfaces of the yoke 55 and the yoke support 57 will be directly proportional to the load exerted thereon, while the frictional torque is in direct proportion to the radius of the arcuate bearing surfaces 67. In the present design the radius of the bearing surfaces is kept to a minimum consistent with producibility and strength, and thus the frictional torque is minimized. It should also be noted that present construction of the yoke 55 and the yoke support 57 results in the length and thickness of the yoke 55 being respectively shorter and greater than comparable components of presently used devices. The shorter length and increased thickness of the yoke 55 reduces unit deflections under load and the resulting vibrations which results in an extremely quiet pump compared to such presently used designs.

Since the periphery of the yoke support 57 is rectangular and the periphery of the yoke 55 is circular, each corner 117 of the yoke support 57 will project radially outwardly beyond the yoke 55. Although not shown, the longitudinal center of the rollers of bearing 90 are axially positioned with respect to the center of a plane passing through the center of each piston ball 44 by the abutment of the thrust plate facing side of outer race 90 against the corners of the yoke support 57. This arrangement provides a simple construction which insures proper axial alignment which is essential for a smooth, efficient and accurate operation of the pump 10.

The amount of reciprocal motion of the pistons 38 within their respective bores 36 and thus the amount of fluid displaced by the pump 10 is controlled by the angle of inclination of the thrust plate face 93 with respect to the axis of rotation of the cylinder barrel 34. In the position illustrated, the face 93 of the movable yoke 55 is perpendicular to the axis of rotation of the cylinder barrel 34 and thus there will be a minimum amount of reciprocal movement of the pistons within their respective bores and thus a minimum or no-flow condition will exist. As the movable yoke 55 is tilted or inclined with respect to the longitudinal axis of rotation of the cylinder barrel 34, the amount of reciprocal movement between the pistons 38 and their respective bores will increase until the movable yoke 55 has been inclined, with respect to the axis or rotation of the cylinder barrel 34, to a maximum amount. The tilting of the movable yoke 55 to impart a reciprocal motion to the pistons 38 with respect to their cylinder bores 36 is well known to those skilled in the art of axial piston pumps and motors and a further detailed description is not deemed necessary.

The movement of the yoke 55 to various positions with respect to the rotating axis of the cylinder barrel 34 is accomplished by means of the yoke arm 77, the U-shaped member 79, the coupling pin 87 and any suitable displacement control mechanism, such as the interchangeable mechanism to be described hereinafter.

Referring to FIG. 4, it can be seen that when a suitable displacement control mechanism is actuated to move the coupling pin 87, the same moves along a linear path 120, while the arm 77 will follow an arcuate path 122. The relative rotational movement of the pin 87 within the bore 85 of the U-shaped member 79 and the reciprocal movement of the U-shaped member 79 on the arm 77 permits the U-shaped member to transfer the linear motion of the pin 87 into an arcuate motion of the arm 77 and thus to the movable yoke 55. It can thus be seen that when the pin 87 is moved upwardly (as viewed in FIG. 4) along the linear path 120 to incline the face 93 of the yoke 55 to a maximum condition, the U-shaped member 79 will move rightwardly along the arm 77 to the position 124 as the arm 77 follows the arcuate path 122. When it is desired to incline the face 93 of the yoke 55 to a maximum inclination in an opposite direction, that is, to reverse the direction of flow from the pump 10, the displacement control mechanism actuates the coupling pin 87 to move it downwardly (as viewed in FIG. 4) along the linear path 120 to the position 126 wherein the U-shaped member 79 will reciprocate along a portion of the arm 77 as the U-shaped member 79 and pin 87 move along the linear path 120 and the arm 77 follows the arcuate path 122.

Figure 2:
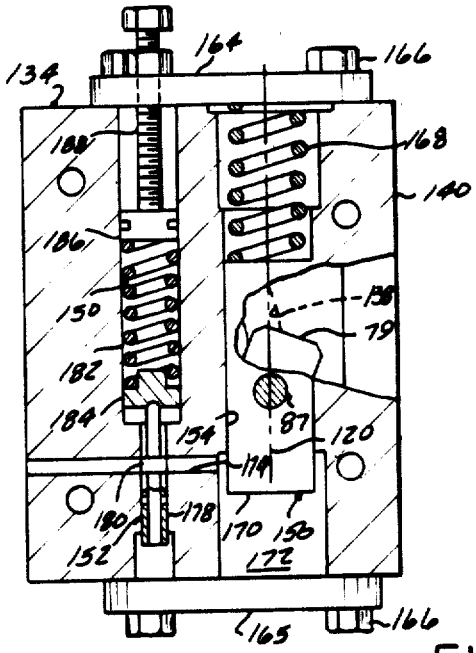
FIG. 2 is a fragmentary, cross-sectional view of the displacement control mechanism taken along line 2—2 of FIG. 1.

In FIGS. 1 and 2, the pump 10 is illustrated as having a displacement control mechanism 134 of the pressure compensated type and comprising a coupling plate 136 having an elongated aperture 138 through which pin 87 extends and which aperture 138 defines the linear path 120 (FIG. 5). The pressure compensated displacement control mechanism 134 further comprises an upper housing portion 140 which, together with the plate 136, is fastened to the body section 14 adjacent the opening 89 by any suitable fastening means, such as elongated screws 142 extending through the upper housing 140, the coupling plate 136 and into threaded bores (not shown) in the body section 14 of the pump 10.

It should be noted that the plate 136 need not be a separate element, but may be an integral part of the upper housing 140.

The upper housing 140 includes two parallel bores, one bore 150 having a pressure compensator valve 152 carried therein, while the other bore 154 has a pressure responsive piston member 156 slidably mounted therein which, in turn, is attached to the yoke 55 by the connecting pin 87 extending through the elongated slot 138 in the coupling plate 136 and the opening 89 in the wall of the housing section 14. Each of the bores 150 and 154 are enclosed at their open ends by closure plates 164 and 165 secured to the upper housing 140 by screws 166 or the like. The piston carrying bore 154 has a spring 168 disposed between the closure plate 164 and the one side of the pressure responsive piston 156 to bias the piston 156 toward the other end of the bore 154. The pressure responsive piston 156 is so attached to the yoke 55 that the yoke 55 is normally pivoted toward a maximum inclination or maximum flow position when piston 156 is nearest the closure plate 165 as illustrated in FIG. 2. The inner end 170 of the piston 156 and the associated end of the bore 154 form a pressure chamber 172 adapted to be selectively communicated to a source of fluid pressure generating a force acting on the piston 156 to move the same against the bias of the spring 168 and move the coupling pin 87 along the linear path 120 and thus stroke the yoke 55 toward a minimum displacement position. The pressure chamber 172 is supplied with fluid pressure through a passageway 174 in communication with the high pressure port of the device 10. The bore 154 is enlarged at the pressure chamber end to provide a path between the passageway 174 and the pressure chamber 172, which permits a construction having a minimum amount of passageways, while at the same time allowing for a compact construction of the mechanism 134.

The pressure compensator valve 152 comprises a piston member 178 having the sealing land 180 adapted to control the amount of fluid through the passageway 174 to the pressure chamber 252. The piston member 178 is normally biased to a closed position by a spring 182 disposed between one end 184 of the piston member 178 and a second movable wall member 186 which, in turn, is axially adjustable within the bore 150 by a threaded member 188 extending through the wall of the housing 140 and externally thereof. By adjusting the position of wall member 186 with respect to the piston end wall 184, the compression force of the spring 182 may be varied to thereby vary the amount of force necessary to move the piston 178. The inner piston end of the valve 152 is connected directly to high pressure generating a force against the piston 178, urging it against the bias of the spring 182. When the pressure of the pump 10 exceeds a predetermined value, the sealing land 180 is moved toward an opened position, permitting fluid pressure to pass thereby and into the pressure chamber 172, generating the aforementioned force for urging the piston member 156 to move against the bias of the spring 168. A pressure between 200 psi and 300 psi acting against the piston member 156 will move the same a sufficient distance to stroke the yoke 55 from a full flow or maximum displacement to a near zero flow or minimum displacement, that is, the U-shaped member 79 will move from the position 126 (FIGS. 2 and 4) to the position 127 (FIG. 4).

Figure 3:
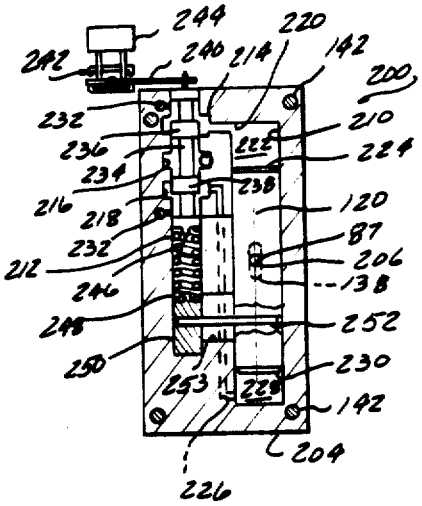
FIG. 3 is a fragmentary, cross-sectional view of a second type of displacement control mechanism which is interchangeable with the mechanism illustrated in FIG. 1.

Referring now to FIG. 3, there is illustrated, on a reduced scale, a servo-operated displacement control mechanism 200 for varying the inclination of the face 93 of the movable yoke 55 to selectively control the displacement or flow output of the pump 10. In order to use the servo-operated displacement control mechanism 200 on the pump 10, the pressure compensated displacement control mechanism 134 is first removed by removing the screws 142. The plate 136 is adapted for use with the servo mechanism 200 as well as the pressure compensated mechanism 134. The servo mechanism 200 is positioned on top of the coupling plate 136 and screws 142 extend through the upper housing 202 of the servo mechanism 200 into the aforementioned threaded bores in the pump housing section 14. Upon placement of the servo housing 202 in position on the coupling plate 135, the coupling pin 87 will extend into a bore 206 in an actuating piston 208 reciprocally mounted within a longitudinal bore 210 within the servo mechanism 200. As the servo-actuating mechanism piston 208 is reciprocated in a pressure bore 210 in a manner which will be described hereinafter, the coupling pin 87 is moved along the linear path 120 and thus the movable yoke 55 may be inclined with respect to the rotating axis of the cylinder barrel 34 in the same manner as hereinbefore described with respect to the pressure compensated displacement control mechanism 134. The housing 202 of the servo-operated displacement control mechanism 200 further comprises two parallel, spaced bores, the larger of which is the pressure bore 210, while the second bore 212 has a plurality of axially spaced ports 214, 216 and 218. The port 214 communicates via a passageway 220 with a pressure chamber 222 formed at one end 224 of the piston 208, while the port 218 communicates via a second passageway 226 with a second pressure chamber 228 formed on the opposite end 230 of the piston 208. The intermediate port 216 of the bore 212 is connected to a source of pressure, such as the high pressure output port of the pump 10 or a second pump operated in tandem with the main pump which supplies control pressure and is adapted to be selectively communicated to the ports 214 and 218. When pressure fluid is communicated through the port 214, the fluid within chamber 222 acts against the top end 224 of the piston 208 to move the same downwardly, whereby the coupling pin 87 carried by the actuating piston 208 is moved along the linear path 120 from the position 127 (FIG. 4) to the position 126, thereby changing the displacement of the pump 10 from a minimum or zero flow displacement to a maximum or full flow displacement. At the same time, the U-shaped member 79 will reciprocably move along a portion of the arm 77 in the manner hereinbefore described to move the arm 77 along the arcuate path 122.

When pressure fluid is communicated to the other port 218 and thus to the pressure chamber 228, the fluid acts against the piston bottom side 230 to move the piston upwardly and thus move the coupling pin 87 and the U-shaped member 79 upwardly along the linear path 120 from the maximum or full flow displacement position 126 back to the minimum or zero flow displacement position 127 or beyond to the maximum reverse flow position 124 hereinbefore described. The bore 212 is further provided with a pair of exhaust ports 232 which communicate one of the ports 214 or 216 with a reservoir (not shown) when the other port 218 or 214 is in communication with the pressure port 216. Communication between the pressure inlet port 216 and the two outlet ports 214 and 218 is controlled by a reciprocally mounted spool 234 having a pair of spaced lands 236 and 238, which are adapted to cooperate with the ports 214, 216 and 218 to control communication therebetween, the operation of which is conventional. One end of the spool 234 is attached to an armature 240 of a torque motor 242 and in response to a predetermined electrical signal from a source 244 the spool 234 will be moved leftwardly or rightwardly to communicate pressure to the appropriate port depending upon the type of actuation desired, i.e. whether the pump is desired to be stroked toward a minimum or a maximum flow condition. The opposite end of the spool forms a seat 246 for one end of a spring 248, while the other end of the spring 248 is seated on a reciprocally mounted feedback member 250 in bore 212. The feedback member 250, in turn, carries a feedback linkage 252 connected to the actuating piston 208. The feedback linkage 252, which extends through an elongated slot 253 in the housing 204 connecting the bores 210 and 212, connects the feedback member 250 to the actuating piston such that the two components move together as a unit. Thus, when the servo torque motor 242 is actuated to move the spool 234 downwardly to communicate fluid pressure to the lower port 218 and thus to the pressure chamber 228 to shift the actuating piston 208 upwardly and stroke the pump 10 in a minimum flow condition or at some intermediate point therebetween, the spring 248 will be further compressed by the upward movement of the piston 208 because of its feedback linkage 252, all of which exerts a greater force on the spool 234 to return it to its original position against the force of the torque motor 242. The spool 234 will move to a position corresponding to the proper movement of the piston 208, which is a function of the electrical signal fed to the torque motor 242. The greater the electrical input signal into the torque motor 242, the further the actuating piston 208 will move before the spring 248 overcomes the force of the torque motor 242.

Figure 6:
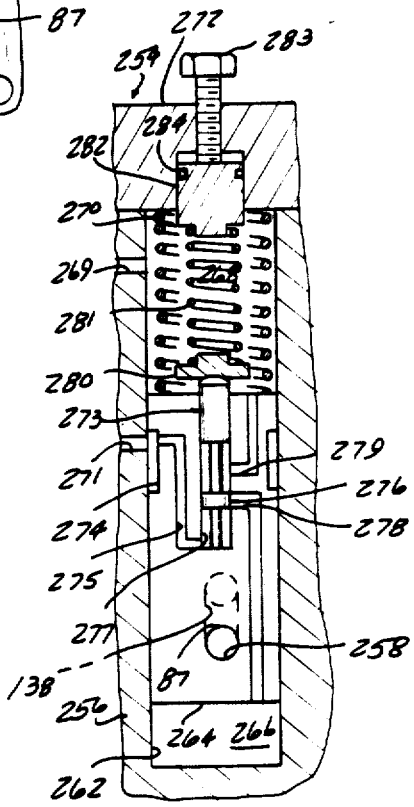
FIG. 6 is a fragmentary, cross-sectional view of another type of displacement control mechanism which is interchangeable with the mechanisms illustrated in FIGS. 1 and 3.

Referring now to FIG. 6 wherein there is illustrated a displacement control mechanism 254 for varying the inclination of the face 93 of the movable yoke 55 with respect to the axis of rotation of the cylinder barrel 34 to vary the flow output of the pump 10. The displacement control mechanism 254 comprises an upper housing 256 positioned on the coupling plate 136 and attached to the pump 10 by the screws 142 extending through the housing 256 and into threaded bores in the pump housing section 14 in the same manner as hereinbefore described with respect to the mechanisms illustrated in FIGS. 1, 2 and 3. Upon placement of the housing 256 in position on the coupling plate 136, the coupling pin 87 extending through the slot 138 will be received in a bore 258 of an actuating piston 260 reciprocably mounted in a longitudinal bore 262 of the upper housing 256. The inner end 264 of the piston 260 and the inner end of the bore 262 define a pressure chamber 266 which, when communicated to pressure fluid, exerts a force against the end 264 of the piston 260 to shift the same upwardly as viewed in FIG. 6. As the piston 260 moves upwardly under the force of pressure communicated to the pressure chamber 266, the pin 87 will be moved within the slot 138 along the linear path 120 to shift the movable yoke 55 from a full flow position toward the zero flow position in the same manner as hereinbefore described.

The opposite end of the bore 262 defines a chamber 268 which is normally vented to a reservoir (not shown) via passageway 269 and has a spring 270 with one end bearing against the piston 260, while the other end of the spring 270 bears against a cover plate 272 which in turn encloses the housing bore 262. The spring 270 exerts a predetermined force against the piston 260 to bias the same downwardly to normally maintain the pump 10 in a full flow condition. The spring 270 functions in a manner similar to the spring 168 hereinbefore described in respect to the pressure compensated displacement control mechanism 134 illustrated in FIG. 2.

The pressure is communicated to the pressure chamber 266 at the end of the longitudinal bore 262 from the high pressure outlet port of the pump 10 through a passageway 271 and a valving spool 273 having a land 276 which controls the amount of fluid pressure communicated to the chamber. The piston 260 has an annular groove 274 which is always in constant communication with the high pressure passageway 271 as the piston 260 is reciprocated within the bore 262.

An annular groove 274 communicates fluid pressure through a passageway 275 in the actuating piston 260 to a longitudinally disposed bore 277 within which is reciprocably mounted the valving spool 273. The bore 277 has a pair of pressure ports 278 and 279 which respectively communicate with the pressure chamber 266 and the vented chamber 268 at the opposite ends of the piston 260. The spool land 276 is adapted to control communication through the pressure port 278 between the pressure chamber 266 and the bore 277 as relative movement takes place between the actuating piston 260 and the spool 273. When the inner end of the spool 273 abuts the blind end of the bore 277, communication between the chamber 266 and bore 277 is closed.

The opposite end of the spool 273 is rounded and engages a spring seat 280 mounted on one end of a second spring 281, the other end of which is carried by a movable spring seat 282, the position of which is controlled by an adjusting screw 283 extending through the cover 272. Suitable O-ring seals 284 around the seat 282 prevent the leakage of fluid from the chamber 268.

It can thus be seen that when high pressure fluid enters the inner end of the spool bore 277, a force is exerted against the spool 273 to move the same upwardly against the bias of the spring 281 to open the pressure port 278 and communicate fluid to the pressure chamber 266 at the inner end of the actuating piston 260 to exert a force against the piston 260 and to move the same upwardly against the bias of the spring 270. The actuating piston 260 following the movement of the spool 273 in a master-slave relationship will move to a location depending upon the relative spring forces exerted on the piston 280 and spool 273, at which time the flow to the pressure chamber 266 is cut off and the pump 10 will be positioned at some output level corresponding to the positioning of the yoke 55 by the piston 260. By adjusting the amount of precompression of the spring 281 by adjusting the position of the movable seat 282, the pressure level necessary to move the spool 273 upwardly in order to communicate fluid to the pressure chamber 260 can be selectively controlled.

Figure 7:
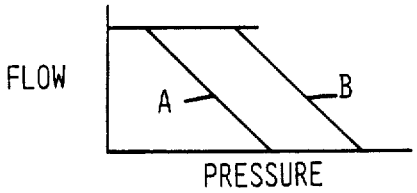
FIG. 7 is a graphical illustration of the performance characteristics of the displacement control mechanism illustrated in FIG. 6.

Referring to FIG. 7, there is illustrated flow versus pressure curves for various setting on the inner spring 281, for example, curve A illustrates the spring 281 with a small amount of precompression, while curve B illustrates the spring 281 with a greater amount of precompression and thus a greater pressure is necessary to overcome the spring 281 before pressure is communicated to the chamber 266 to move the piston 260 and change the displacement of the pump 10. As illustrated in FIG. 7, at lower pressures a high flow is available, while as the pressure increases the rate of flow decreases and thus the mechanism 254 approximates a constant horsepower output. It can thus be seen that the displacement control mechanism illustrated in FIG. 7 provides a very simple, compact and accurate means for providing a constant horsepower variable displacement pump.

Figure 9:
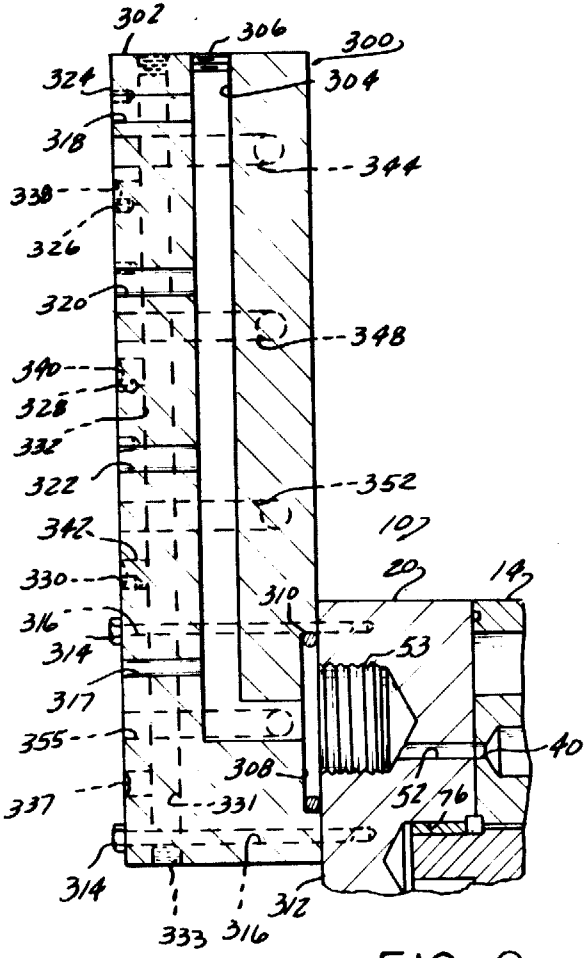
FIG. 9 is a cross-sectional view of the fluid device taken along line 8—8 of FIG. 8.
Figure 8:
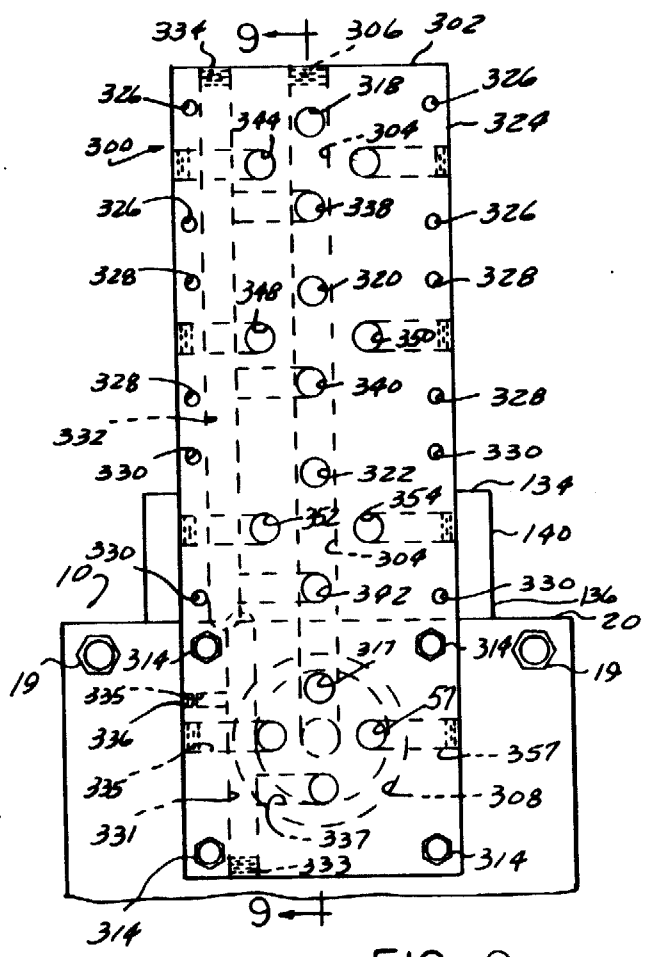
FIG. 8 is a fragmentary, side elevational view of the fluid device converted into a manifold system.

Referring now to FIGS. 8 and 9 wherein there is illustrated a manifold 300 adapted to be mounted to the pump 10 for converting the same into a manifold system that is adapted to accommodate a plurality of sub-plate mounted valves with a minimum of external plumbing as will be described in greater detail hereinafter. The manifold 300 comprises a generally rectangularly shaped housing 302 having an L-shaped bore 304 which is enclosed at one end by a plug 306, while the other end of the L-shaped bore 304 communicates through an enlarged recess 308 with the high pressure outlet port 53 of the pump 10. The recessed portion 308 formed on the outer face of the housing 302 adjacent the port 300 accommodates a suitable seal such as O-ring 310. The manifold housing 302 is secured to the flat outer face 312 of the pump 10 by a plurality of strategically located screws 314 which extend through bores 316 in the housing 302 into threaded bores in the cover 20 of the pump 10. In addition to mounting the manifold 300 to the device 10, the screws 314 are also adapted to mount a flow control valve, such as a directional control valve, to the manifold 300 as will be described hereinafter.

The internal passageway 304 communicates the pressure fluid to each of a plurality of spaced passageways 317, 318, 320 and 322, each of which terminates in the outer face 324 of the housing 302.

As can best be seen in FIG. 8, the outer face 324 of the manifold 300 is provided with a plurality of sets of threaded bores respectively indicated by numerals 326, 328 and 330, which threaded bores are adapted to receive the mounting screws of a plurality of any one of a number of sub-plate mounted valves, as for example, directional control valves, sequence valves, pressure relief valves and the like, all of which will be explained hereinafter.

A pair of intersecting bores 332 and 331 form a passage extending the full length of the housing 302 and are respectively enclosed at their ends by plugs 334 and 333. The mid-portion of the bore 331 is intersected by a bore 335 threaded at 336 to receive a suitable line to communicate the bores 332, 331 and 335 back to a reservoir (not shown), such that the bores 332, 331 and 335 are normally at a low or return pressure. The return pressure bores 332, 331 communicate with the face 324 of the housing through a plurality of inclined passageways 337, 338, 340 and 342 which, as can best be seen in FIG. 8, are spaced just below the pressure ports 317, 318, 320 and 322, respectively. Still referring to FIG. 8, it can be seen that the housing 302 has a plurality of L-shaped passageways opening to the face 324 at strategic locations between the high pressure passageways and the return passageways. At the upper end of the housing, the L-shaped passageways 344 and 346 open to the face 324 on opposite sides and between the pressure opening 318 and the return passageway 338. The L-shaped passageways 344 and 346 respectively extend downwardly into the housing and out the sides thereof for communication with appropriate hose couplings. Likewise, the L-shaped passageways 348 and 350 are grouped between and to the side of the openings 320 and 340, while L-shaped passageways 352 and 354 are associated with the high pressure passageway 322 and return passageway 342 and L-shaped passageways 355 and 357 are associated with the high pressure passageway 317 and return passageway 331. The passageways 348-357 similarly extend downwardly into the housing 302 and outwardly to the sides for communication with hose couplings adapted to carry the pressure fluid to a fluid user.

It can thus be seen that the mounting manifold 300 provides a very simple means for attaching any one of a plurality of valves to the pump 10 with a minimum of external plumbing. As for example, a conventional directional control valve could be mounted to the upper portion of the housing 302 with the mounting screws of the directional control valve extending into threaded engagement with the mounting bores 326, such that the pressure passageway 318 communicates with the pressure inlet of the directional control valve while the return passageway 338 of the manifold 300 communicates with the return port of the directional control valve and the outlet ports 344 and 346 would respectively communicate with the conventional A and B ports of the directional control valve, such that when the directional control valve is shifted in the conventional manner high pressure fluid may be selectively communicated from the pressure port 318 of the manifold 300 to either the outlet port 344 or 346 or alternately the pressure can be dumped back to the reservoir via port 338. Such a directional control valve could be mounted to the face 324 of the manifold 300 by the mounting screws 314 when the same are used to mount the manifold 300 to the device 10.

Similarly, a high pressure relief valve can be mounted to the intermediate portion of the manifold block 300 by having the mounting screws of the pressure relief valve extend into threaded engagement with the mounting bores 328 of the manifold, such that the high pressure passageway 320 communicates with the high pressure inlet of the pressure relief valve, while the outlet of the pressure relief valve communicates with the return port 340 of the manifold 300 such that when pressure of the pump 10 exceeds some predetermined value, the high pressure relief valve will function in the conventional manner to dump pressure from the high pressure port 320 back to the reservoir via the tank port 340. When the pressure relief valve is used on the intermediate portion of the manifold 300, the manifold outlets ports 348 and 350 would not be in communication with any fluid.

Similarly, the next lower portion of the manifold 300 can be adapted to mount any other type valve needed for the particular application, such as a sequence valve or another directional control valve.

It can also be seen that the manifold 300 may be of any desired length and adapted to accommodate any number of a plurality of valves, all of which will be dependent upon the particular application.

It can thus be seen that the present invention provides a manifold system which is easily attached to a conventional flow generating device, such as the pump 10, and which provides a simple and easy manner of attaching a plurality of different types of flow control devices, such as directional control valves and the like, and with a minimum of external plumbing.

It can also be seen that the present invention provides a means in which the movable yoke 55 may be moved from a minimum or no-flow condition to a maximum or full-flow condition simply by the movement of the coupling pin 87 along the linear path 120, all of which is due to the simple and unique arrangement of U-shaped member 79 reciprocally mounted on the arm 77. It can also be seen that the U-shaped member 79 and coupling pin 87 permit the interchangeable use of any type of displacement control mechanism simply by coupling the mechanism to the outer face of the pump housing and connecting the actuating portion of the displacement control mechanism to the coupling pin 87.

Although it has been heretofore indicated that the pin 87 is fixedly attached to the U-shaped member bore 85, it should be noted that the pin 87 may be rotatably carried within the bore 85 of the U-shaped member 79 and fixedly attached to the actuating piston of whichever type of displacement control mechanism is used.

It can thus be seen that the present invention provides a new, rugged, compact, and low cost fluid device of the axial piston type which may function as either a motor or a pump, which has a new, simple, and improved means for controlling the displacement of the pump, and which provides for the interchangeability of various types of displacement control mechanisms without any internal modification of the basic pump design.

While the form of the present invention as disclosed herein constitutes a preferred form, it is to be understood that other forms may be adopted, all coming within the spirit of the invention and the scope of the appended claims.

What is claimed is as follows:

[1. A fluid pressure energy translating device of the axial piston type comprising:

a housing;

a shaft rotatably mounted in said housing;

a cylinder barrel carried by said shaft and rotatable therewith, said cylinder barrel having a plurality of arcuately spaced cylinder bores and cylinder ports communicating said cylinder bores with one end of said cylinder barrel;

a plurality of pistons with inner ends disposed for reciprocal stroking movement within said cylinder bores;

a valve face having arcuate openings disposed for relative rotary movement with respect to said one end of said cylinder barrel, with said cylinder ports communicating successively with said arcuate openings as said shaft rotates said cylinder barrel;

a thrust plate pivotably mounted in said housing in a driving relationship with the outer end of said pistons for imparting said reciprocal stroking movement to said pistons within said cylinder barrel bores, the amount of reciprocal movement of said pistons being a function of the degree of inclination of said thrust plate with respect to the axis of rotation of said cylinder barrel;

an arm member carried by said thrust plate and pivotable therewith along an arcuate path; said thrust plate being movable along said arcuate path when said arm member is moved along said arcuate path;

a coupling means reciprocally mounted on said arm member, said coupling means being movable along a linear path in addition to the reciprocal movement on said arm member; said coupling means pivoting said arm member along said arcuate path when said coupling means is moved along said linear path and said coupling means reciprocates on said arm member, whereby the degree of inclination of said thrust plate with respect to the axis of said rotating cylinder barrel may be selectively varied;

a displacement varying mechanism carried by said housing and operatively coupled to said arm member by said coupling means and adapted to move said coupling means along said linear path to move said arm member along said arcuate path;

said coupling means further comprising a U-shaped member reciprocably mounted on a portion of said arm member, said U-shaped member being movable along said linear path, a coupling pin carried by said U-shaped member and connecting said U-shaped member to said displacement control mechanism such that when said displacement control mechanism moves said pin along said linear path said U-shaped member reciprocates along said arm member to impart said arcuate movement to said thrust plate.]

[2. The fluid device defined in claim 1 wherein said pin has one end removably attached to said displacement control mechanism, while the other end of said pin is fixedly attached to said displacement control mechanism.]

[3. The fluid device defined in claim 1 wherein one end of said coupling pin is removably attached to said U-shaped member, while the other end of said pin is fixedly attached to said displacement control mechanism.]

[4. A fluid pressure energy translating device of the axial piston type comprising:

a housing;

a shaft rotatably mounted in said housing;

a cylinder barrel carried by said shaft and rotatable therewith, said cylinder barrel having a plurality of arcuately spaced cylinder bores and cylinder ports communicating said cylinder bores with one end of said cylinder barrel;

a plurality of pistons with inner ends disposed for reciprocal stroking movement within said cylinder bores;

a valve face having arcuate openings disposed for relative rotary movement with respect to said one end of said cylinder barrel, with said cylinder ports communicating successively with said arcuate openings as said shaft rotates said cylinder barrel;

a thrust plate pivotably mounted in said housing in a driving relationship with the outer end of siad pistons for imparting said reciprocal stroking movement to said pistons within said cylinder barrel bores, the amount of reciprocal movement of said pistons being a function of the degree of inclination of said thrust plate with respect to the axis of rotation of said cylinder barrel;

an arm member carried by said thrust plate and pivotable therewith along an arcuate path; said thrust plate being movable along said arcuate path when said arm member is moved along said arcuate path;

a coupling means reciprocally mounted on said arm member, said coupling means being movable along a linear path in addition to the reciprocal movement on said arm member;

said coupling means pivoting said arm member along said arcuate path when said coupling means is moved along said linear path and said coupling means reciprocates on said arm member, whereby the degree of inclination of said thrust plate with respect to the axis of said rotating cylinder barrel may be selectively varied;

said thrust plate further comprising a support member carried by said housing, said support member having a pair of longitudinally projecting sides with arcuately shaped bearing surfaces formed thereon;

a movable yoke having a bearing surface cooperating with said other end of said pistons to impart said reciprocal movement thereto, said movable yoke having a pair of aligned support pins extending transversely of said shaft axis and pivotably mounted in said arcuately shaped bearing surfaces of said support member, said support pins having a surface contour mating with said arcuately shaped bearing surfaces, said movable yoke being pivotable about an axis defined by said support pins and said arcuately shaped varying surfaces to vary the inclination of said thrust plate with respect to the axis of rotation of said cylinder barrel;

said arm member carried by and radially extending from one of said support pins and pivotable therewith about said axis of said support pins;

a U-shaped member reciprocably mounted along a portion of said arm member;

a coupling pin carried by said U-shaped member and extending externally of said housing; and a displacement varying mechanism carried externally of said housing and connected to said coupling pin so as to impart a linear motion to said pin when said mechanism is actuated, whereby said arm member is moved along said arcuate path to change the inclination of said thrust plate movable yoke with respect to the axis of rotation of said cylinder barrel.]

[5. A fluid pressure energy translating device of the axial piston type comprising:

a housing;

a shaft rotatably mounted in said housing;

a cylinder barrel carried by said shaft and rotatable therewith, said cylinder barrel having a plurality of arcuately spaced cylinder bores and cylinder ports communicating said cylinder bores with one end of said cylinder barrel;

a plurality of pistons with inner ends disposed for reciprocal stroking movement within said cylinder bores;

a valve face having arcuate openings disposed for relative rotary movement with respect to said one end of said cylinder barrel, with said cylinder ports communicating successively with said arcuate openings as said shaft rotates said cylinder barrel;

a thrust plate pivotably mounted in said housing in a driving relationship with the outer end of said pistons for imparting said reciprocal stroking movement to said pistons within said cylinder barrel bores, the amount of reciprocal movement of said pistons being a function of the degree of inclination of said thrust plate with respect to the axis of rotation of said cylinder barrel;

an arm member carried by said thrust plate and pivotable therewith along an arcuate path; said thrust plate being movable along said arcuate path when said arm member is moved along said arcuate path;

a coupling means reciprocally mounted on said arm member, said coupling means being movable along a linear path in addition to the reciprocal movement on said arm member; said coupling means pivoting said arm member along said arcuate path when said coupling means is moved along said linear path and said coupling means reciprocates on said arm member, whereby the degree of inclination of said thrust plate with respect to the axis of said rotating cylinder barrel may be selectively varied;

a displacement varying mechanism carried by said housing and operatively coupled to said arm member by said coupling means and adapted to move said coupling means along said linear path to move said arm member along said arcuate path;

said displacement varying mechanism further comprising a second housing carried by said first housing; said second housing having a bore with a pressure responsive member slidably mounted therein and biased to a predetermined position;

valve means responsive to a predetermined operating pressure of said fulid device to supply a second pressure of a predetermined value to said pressure responsive member to move same from said predetermined position, said coupling means being carried by said pressure responsive member; and said coupling means being moved along said linear path as said pressure responsive means is moved from said predetermined position to pivot said thrust plate with respect to the axis of rotation of said cylinder barrel.]

[6. The fluid device defined in claim 5 wherein said coupling means comprises a U-shaped member reciprocably mounted on a portion of said arm member, said U-shaped member being movable along said linear path; a coupling pin carried by said U-shaped member and connecting said U-shaped member to said pressure responsive member of said mechanism, such that when said pressure responsive means is moved from said predetermined position said pin is moved along said linear path to reciprocate said U-shaped member along said arm member to impart said arcuate movement to said thrust plate.]

[7. A fluid pressure energy translating device of the axial piston type comprising:

a housing;

a shaft rotatably mounted in said housing;

a cylinder barrel carried by said shaft and rotatable therewith, said cylinder barrel having a plurality of arcuately spaced cylinder bores and cylinder ports communicating said cylinder bores with one end of said cylinder barrel;

a plurality of pistons with inner ends disposed for reciprocal stroking movement within said cylinder bores;

a valve face having arcuate openings disposed for relative rotary movement with respect to said one end of said cylinder barrel, with said cylinder ports communicating successively with said arcuate openings as said shaft rotates said cylinder barrel;

a thrust plate pivotably mounted in said housing in a driving relationship with the outer end of said pistons for imparting said reciprocal stroking movement to said pistons within said cylinder barrel bores, the amount of reciprocal movement of said pistons being a function of the degree of inclination of said thrust plate with respect to the axis of rotation of said cylinder barrel;

an arm member carried by said thrust plate and pivotable therewith along an arcuate path; said thrust plate being movable along said arcuate path when said arm member is moved along said arcuate path;

a coupling means reciprocally mounted on said arm member, said coupling means being movable along a linear path in addition to the reciprocal movement on said arm member; said coupling means pivoting said arm member along said arcuate path when said coupling means is moved along said linear path and said coupling means reciprocates on said arm member, whereby the degree of inclination of said thrust plate with respect to the axis of said rotating cylinder barrel may be selectively varied;

said coupling means further comprising a U-shaped member reciprocably movable along a portion of said arm member;

a coupling pin carried by said U-shaped member and extending externally of said housing; and means for moving said coupling pin along a linear path to impart said arcuate movement to said arm member as said U-shaped member reciprocably moves along said arm member.]

8. [A a fluid device of the type] *In an axial piston pump* having *a main housing including a valve face, a cylinder barrel mounted in said main housing for rotation about a main axis normal to said valve face and carrying an annular array of pump pistons axially reciprocable within said barrel, drive shaft means extending coaxially through said barrel for driving said barrel in rotation about said main axis, said drive shaft means being rotatably supported in said main housing by axially spaced bearing means located adjacent opposite ends of said main housing,* an inclinable thrust plate with a *pump* piston engaging face at one end thereof, [said thrust plate adapted to be pivoted about a predetermined axis,] *coaxially aligned support pin means projecting outwardly from opposite sides of said thrust plate rotatably seated in said main housing for mounting said thrust plate for pivotal movement in said main housing about a second axis normal to and intersecting said main axis, said thrust plate having a central passage therethrough through which said drive shaft means freely passes at all pivotal positions of said thrust plate,* said thrust plate having an arm member [disposed] *fixedly mounted thereon and extending longitudinally* along an axis *radial to said second axis and along* which *said arm member* extends *away from said barrel and* toward the other end of said thrust plate;

*the improvement wherein said arm member is mounted at the axial outer end of one of said support pin means and said pump further comprises a displacement control mechanism having a control housing adapted to be fixedly and detachably mounted on the exterior of said main housing adjacent said arm member, said main and said control housings each having an opening therethrough which openings are in registry with each other and said arm member when said control housing is fixedly mounted on said main housing, a control mechanism mounted in said control housing for reciprocable movement relative to said control housing along a linear path aligned with the aforementioned opening in said control housing and perpendicular to both said main and said second axes and located externally of said main housing, a coupling pin having one end attachable to said control mechanism and movable when so attached along said linear path with said control mechanism with the other end of said pin projecting from said control mechanism through said openings into the interior of said main housing;* a U-shaped member, the legs of which encompass a portion of said arm member, said U-shaped member being reciprocable along a portion of said arm member; [as] *said other end of said pin being carried by and coupled to said U-shaped member to move* said arm member [moves] through an arcuate path to pivot said thrust plate about said [predetermined] *second* axis[; and a coupling pin movable along a linear path having one end carried by said U-shaped member,] *upon movement of said pin along said linear path imparted thereto by reciprocating movement of said control mechanism,* said coupling pin being disposed along an axis which is perpendicular to the path of reciprocal movement of said U-shaped member [the other end of said coupling pin being attachable to a displacement control mechanism adapted to impart a linear motion to said coupling pin such that] *along said arm, whereby* said U-shaped member is simultaneously moved along said reciprocal and linear paths [for] *while* pivoting said thrust plate about said predetermined axis.

[9. An article of manufacture for use within a variable displacement fluid pressure energy translating device, comprising:

a pivotable yoke having a bearing surface adapted to cooperate with the fluid displacement means of said device, said movable yoke having a pair of axially aligned mounting pins defining an axis about which said yoke is pivoted;

an arm member carried by and radially extending from one of said support pins and pivotal therewith about the axis of said support pins;

motion transfer means reciprocally mounted on a portion of said arm and adapted to pivot said arm about said axis when said motion transfer means is moved along a linear path;

a coupling pin carried by said motion transfer means and extending externally of said housing, said pin adapted to be coupled to a displacement varying mechanism carried externally of said housing and so connected to said coupling pin as to impart a linear motion to said pin when said displacement varying mechanism is actuated, whereby said arm is pivoted about said axis;

said motion transfer means comprising a U-shaped member encompassing a portion of said arm member and reciprocably mounted along said portion of said arm member, said coupling pin being fixedly attached to said U-shaped member and movable therewith along said linear path as said U-shaped member reciprocates relative to said arm member, said coupling pin extending externally of said housing and rotatably attached to said displacement varying mechanism.]

* * * * *